Aug. 4, 1925. 1,548,427

W. G. ALDEEN

OVERLOAD RELEASE CLUTCH

Filed June 21, 1920

Inventor
Wilhelm G. Aldeen
By Miller Chindahl Parker
Attys

Patented Aug. 4, 1925.

1,548,427

UNITED STATES PATENT OFFICE.

WILHELM GEDOR ALDEEN, OF ROCKFORD, ILLINOIS, ASSIGNOR TO NATIONAL LOCK CO., OF ROCKFORD, ILLINOIS, A CORPORATION OF DELAWARE.

OVERLOAD-RELEASE CLUTCH.

Application filed June 21, 1920. Serial No. 390,532.

*To all whom it may concern:*

Be it known that I, WILHELM GEDOR ALDEEN, a citizen of the United States, residing at Rockford, in the county of Winnebago and State of Illinois, have invented certain new and useful Improvements in Overload-Release Clutches, of which the following is a specification.

My invention relates to the transmission of power and more specifically to compact means for transmitting power to any type of machinery which is subject to occasional accidental stalling, such, for instance, as metal working machinery.

One object of my invention is to provide a connection which will transmit power up to a certain limiting force or torque only and which will not transmit any power if the limiting amount is exceeded until readjusted for the purpose by the operator.

In devices of this type a connecting element withdrawn to interrupt the transmisssion of power is ordinarily allowed to fall back into operative position with each revolution of the device, engaging the power receiving element and striking it a more or less heavy blow, resulting in vibration of the entire machine, noise and excessive wear and occasional breakage of the parts of the transmission itself.

Another object of my invention is to eliminate these defects.

Further objects and advantages of my invention will become apparent as the description proceeds.

Figure 1:
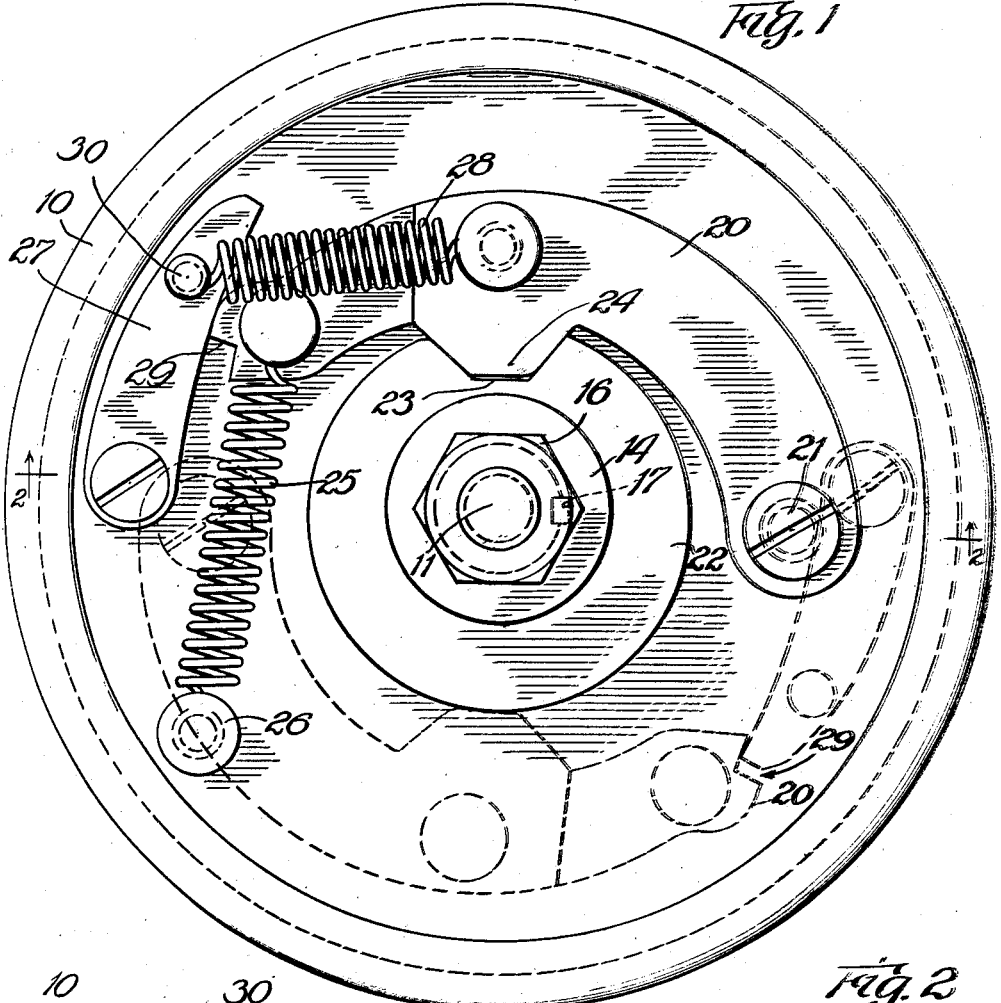
Figure 2:
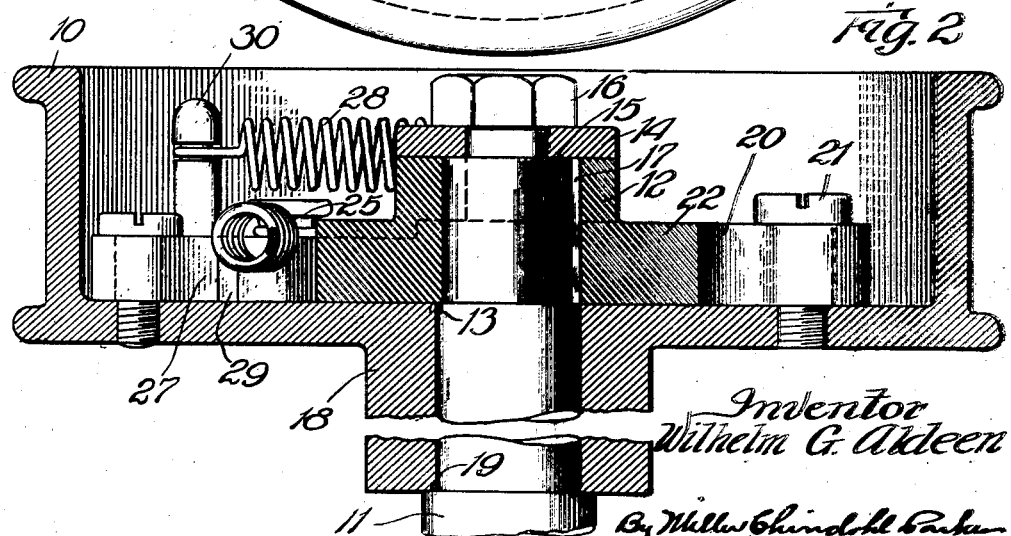

In the accompanying drawings Figure 1 is an end view of a device constructed according to my invention and Fig. 2 is a section on the line 2—2 of Fig. 1.

In the embodiment of my invention selected for illustration, the driving element is in the form of a hollow pulley 10 adapted to receive power from a suitable belt and the driven element is represented by the shaft 11 on which the pulley is mounted. It will, however, be obvious that these parts may be interchanged or that other transmission elements may be substituted for either of both of them. The shaft 11 carries a collar 12 suitably mounted thereon by engagement between a shoulder 13 on the shaft and a washer 14 engaging a second shoulder 15 and overlying the collar and clamped in position by a suitable nut 16. Relative rotation between the collar and shaft are prevented by a suitable key 17.

The pulley and parts carried thereby are rotatably supported by the shaft 11 by the engagement of the pulley sleeve 18 with a cylindrical portion of the shaft terminating in a shoulder 19 between which and the collar 12 the pulley is confined against longitudinal movement. The parts adapted to transmit power from the pulley 10 to the shaft 11 are illustrated in full lines in Fig. 1 in operative position and comprise a curved arm 20 suitably pivoted at 21 on the web of the pulley and extending past the side of the flange 22 carried by the collar 12. The flange 22 has a notch 23 and the curved arm 20 a cooperating projection 24, the sides of which notch and projection are cut at corresponding angles, as clearly shown in Fig. 1 to provide engaging surfaces extending at an angle to radial lines drawn through the points of contact. A tension spring 25 extends from the free end of curved arm 20 to a suitable attachment at 26 on the web of the pulley and normally operates to hold the parts in operative position. The strength of the spring 25 and the slope of the sides of the notch 23 and projection 24 will determine the force or torque necessary to throw the arm 20 out against the action of the spring 25 and allow the flange 22 to move the notch out of register with the projection.

To prevent the projection entering the notch again when the flange 22 has made a complete rotation I have provided a pivoted pawl 27 normally resting with one face in abutment with the end of the curved arm 20 and urged against the curved arm by a tension spring 28 attached to the pawl near its free end and in this instance to an intermediate portion of the arm 20 itself. The free end of the arm 20 has a notch 29 into which the end of the pawl 27 will be thrown by the action of the spring 28 whenever the arm 20 is moved out far enough to clear the end of the pawl. The flange 22 is slightly eccentric with respect to the axis of the shaft 11, and its periphery, as indicated in dotted lines, in Fig. 1, will lift the arm 20 far enough to allow the pawl 27 to enter the notch. On the other hand, the peripheral portions immediately adjacent the notch are a trifle less distant from the center of rotation and will not lift the arm quite far enough to allow the pawl to lock it in open position.

As soon, therefore, as the projection 24 is lifted out of its notch, the relative rotation of the pulley with respect to the shaft will carry the projection around the eccentric periphery of the flange 22, lifting the arm 20 far enough to allow the pawl 27 to lock it. Further rotation to bring the projection back into register with the notch will merely allow the arm to move back by the small clearance indicated at 29 in Fig. 1 and rest against the pawl 27 which will receive the force of the spring 25 and hold the projection 24 completely out of engagement with the flange 22 while the notch passes by and also for a short distance on either side. Continued relative rotation of the pulley and shaft will therefore merely lift the arm a very slight amount off the end of the pawl and lay it back again until the machine has again been put in running order and the source of power disconnected so that the operator can trip the pawl 27 and allow the parts to come back into operative position.

As clearly illustrated in Fig. 2 the pin 30 carried by the pawl 27 for the attachment of the spring 28 projects up farther from the web of the pulley 10 than any other adjacent part so that the operator may without difficulty hold a suitable tool where the rotation of the pulley 10 will throw the pin 30 against it, thus releasing the pawl without stopping the pulley.

While I have described and illustrated in detail a specific embodiment of my invention, it should be clearly understood that the description is only for purposes of illustration and that many modifications and variations will naturally occur to those skilled in the art. I aim in the subjoined claims to cover all such legitimate variations and modifications.

I claim as my invention:

1. In a power transmission, automatic relieving mechanism comprising, in combination, a rotary notched element, a pivoted element, means carried by said last mentioned element to enter said notch for the transmission of power, means for resiliently holding said elements in operative position for transmission of power up to a certain torque, a single pivoted locking element adapted to engage said connecting means when thrown out of operative position by excessive torque and hold it entirely out of contact with said notch or the adjacent portions of said notched member, and means for moving said pivoted element into locked position.

2. In a power transmission, a notched member rotating around an eccentric axis, a pivoted member having a portion adapted to engage in said notch for the transmission of power, resilient means for holding said pivoted element in operative position, the eccentric periphery of said notched member being adapted to engage the pivoted member when thrown out of said notch, and locking means rendered operable by the movement of said pivoted member over the large portion of said eccentric member adapted to hold said member entirely out of contact with said notch and with the portions of the eccentric adjacent said notch.

3. In a device of the class described, an annular housing, means within said housing for the transmission of power, and locking means adapted to lock said power transmission means in inoperative position, said locking means having a pivoted element manually operable to release the power transmission means regardless of its speed or direction of rotation.

4. In a device of the class described, a pulley and a rotatable member having a common axis, said member having a notch in its periphery, an arm pivoted to said pulley and having a portion adapted to enter said notch for the transmission of power, resilient means normally holding said arm in operative position, the periphery of said rotatable member being shaped to raise said arm after it is thrown out of the notch, and a pawl pivoted to said pulley in position to engage said arm when raised and thus hold it entirely out of contact with said notch, said pawl being manually operable to release said arm.

5. In a device of the class described, a pulley and an eccentric having a common axis of rotation, said eccentric having a transversely extending groove in that portion of its outer periphery closest to the axis of rotation, the side walls of said groove forming obtuse angles with the adjacent periphery, a power-transmitting element pivotally mounted in the pulley in normal engagement with said eccentric, resilient means yieldingly holding said element in contact with said groove, and locking means adapted to engage said element during its passage over that portion of the eccentric opposite the groove and to hold said element out of operative engagement with said eccentric.

6. In a device of the class described, a rotating member having a notch, a pivoted arm having a portion adapted to enter said notch to receive power from said rotating member, resilient means normally holding said arm in operative position, and a pivoted latch adapted to engage the end of said arm when thrown into inoperative position and hold said arm permanently in inoperative position.

7. In a device of the class described, a rotating member having a notch, a pivoted arm having a portion adapted to enter said notch to receive power from said rotating member, resilient means normally holding said arm in operative position, a pivoted latch, and resilient means connected to the free end of said latch and a portion of said pivoted arm for pulling said latch into position to lock said arm in inoperative position when said arm has been moved to withdraw said portion from said notch.

8. In a device of the class described, a rotatable member having a notch in its periphery, a pivoted arm having a portion adapted to enter said notch for the transmission of power, resilient means normally holding said arm in operative position, the periphery of said rotatable member being shaped to raise said arm after it is thrown out of the notch, locking means adapted to engage said arm when raised and hold it in raised position entirely out of contact with said notch and a pin projecting from said locking means, manually operable to release said arm from engagement with the locking means.

9. In a device of the class described, a driving element, a driven element having a circular periphery cut away to form opposed shoulders, an arm pivoted on said driving element, a spring forcing one end of said arm into contact with said cut away portion of said driven element to engage either shoulder and drive said driven element under a normal load, said spring being adapted to yield when an abnormal load comes on said driven element and permit said arm to ride off of the shoulder and over the circular periphery of said driven element.

10. In a device of the class described, a driving element, a driven element having a circular periphery cut away to form opposed shoulders, an arm pivoted on said driving element, a spring forcing one end of said arm into contact with said cut-away portion of said driven element to engage either shoulder and drive said driven element under a normal load, said spring being adapted to yield when an abnormal load comes on said driven element and permit said arm to ride off of the shoulder and over the circular periphery of said driven element, and a latch adapted to hold said arm against the engagement with said shoulder in successive revolutions.

In testimony whereof, I have hereunto set my hand.

WILHELM GEDOR ALDEEN.